April 2, 1935.  H. F. SMITH  1,996,441
REFRIGERATING APPARATUS
Original Filed Dec. 17, 1928   5 Sheets-Sheet 1
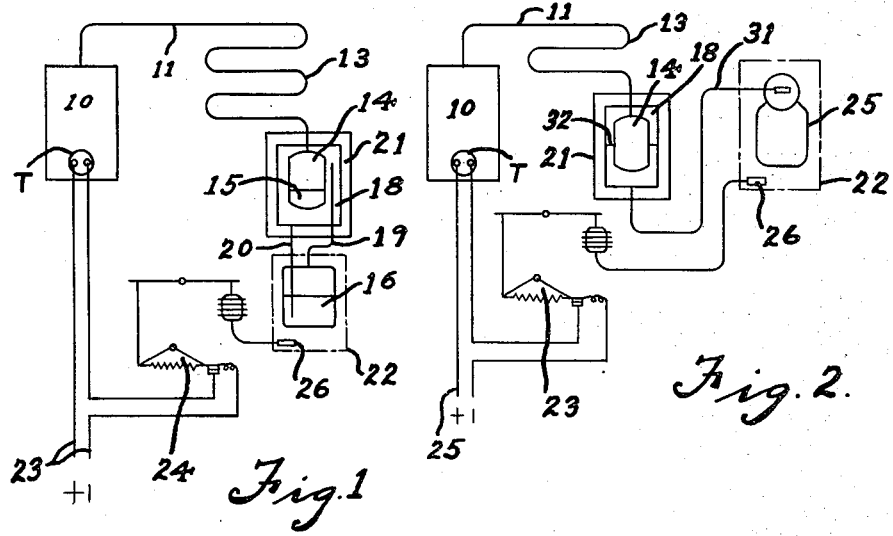
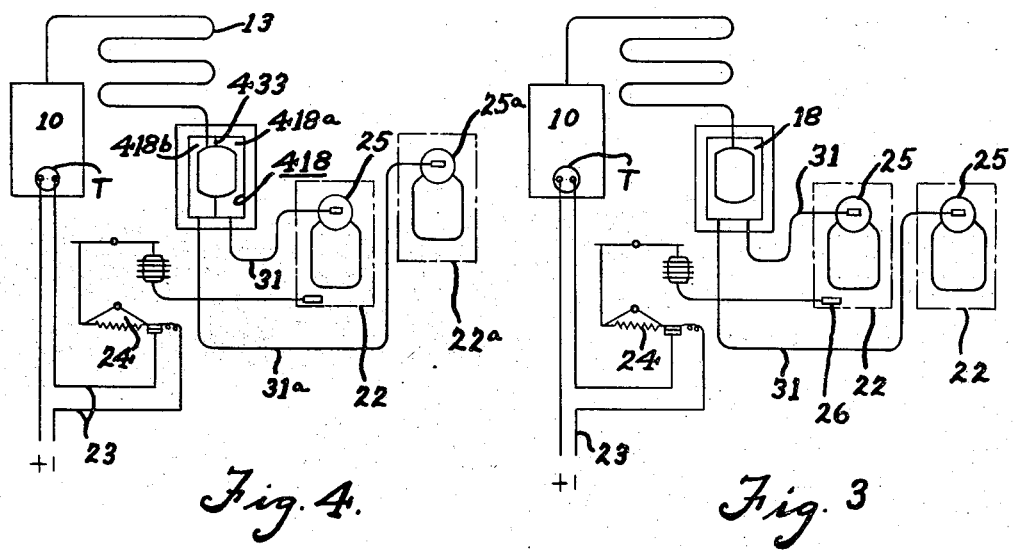
Inventor
Harry F. Smith
By Spencer Hardman & Feли
Attorney April 2, 1935.  H. F. SMITH  1,996,441
REFRIGERATING APPARATUS
Original Filed Dec. 17, 1928    5 Sheets-Sheet 4

Inventor
Harry F. Smith
By Spencer Hardman & Feler
Attorney

April 2, 1935.    H. F. SMITH    1,996,441
REFRIGERATING APPARATUS
Original Filed Dec. 17, 1928    5 Sheets-Sheet 5

Harry F. Smith, Inventor
By Spencer Hardman & Febr
Attorney

Patented Apr. 2, 1935

1,996,441

UNITED STATES PATENT OFFICE 1,996,441

REFRIGERATING APPARATUS

Harry F. Smith, Dayton, Ohio, assignor, by mesne assignments, to General Motors Corporation, a corporation of Delaware Application December 17, 1928, Serial No. 326,464
Renewed December 12, 1931

25 Claims. (Cl. 62—118)

This invention relates to refrigerating apparatus.

One of its objects is to provide an improved refrigerating apparatus, especially but not necessarily of the absorption type, which is adapted to transfer refrigerating effect from the place where it is produced to a distant point.

Another object is to provide a refrigerating apparatus using a plurality of independent refrigerant circuits. Another object is to provide an improved refrigerating system which transfers heat effectively in one direction only.

Another object is to provide an improved refrigerating apparatus having substantially uniform pressures in the refrigerant circuits, and thus to dispense with pressure control devices such as valves, pumps and the like.

Still another object is to provide an absorption refrigerating apparatus which is especially adapted to be interchanged with standard compression apparatus on existing standard cabinets or other installations.

Further objects and advantages of the present invention will be apparent from the following description, reference being had to the accompanying drawings, wherein a preferred form of embodiment of the present invention is clearly shown.

In the drawings

Fig. 1 is an elementary diagrammatic representation of one form of my invention;

Figs. 2 to 8 inclusive are elementary diagrammatic illustrations of various applications of my invention;

Figures 5, 6:
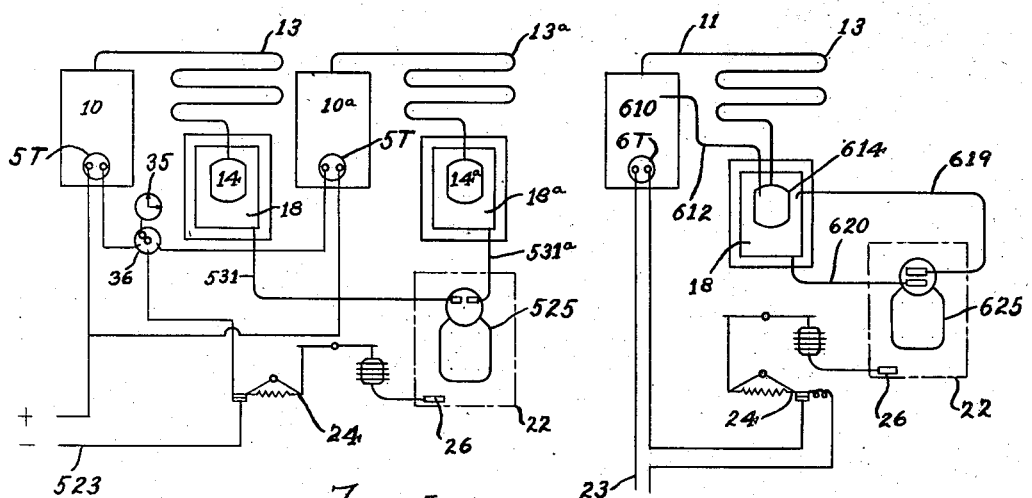

Referring to Fig. 1, 10 represents a compressing device, by which I mean a device which takes in gaseous refrigerant at low pressure, and either simultaneously or subsequently delivers gaseous refrigerant at high pressure. This device may be, for example, either a mechanical compressor, an absorber and generator or a generator-absorber. As represented in Fig. 1, the compressing device 10 operates cyclically, during one phase taking in gaseous refrigerant at low pressure through a conduit 11, and during a subsequent phase of the cycle discharging gaseous refrigerant at high pressure through the same conduit. The high-pressure gaseous refrigerant is liquefied in a condenser 13 and flows to a primary evaporator 14. Throughout the phase during which the compressing device takes in refrigerant, the liquid refrigerant 15 evaporates in the evaporator 14, absorbing heat and producing refrigeration in the well-known manner. The above described apparatus forms a closed circuit for refrigerant, which I call a primary circuit. A secondary refrigerant circuit includes a refrigerating chamber 16 and a chamber forming a circulating device 18. The upper part of the chamber 18 is connected with the upper part of the chamber 16 by a vapor conduit 19, and the chamber 18 drains to the chamber 16 through a liquid conduit 20. The chambers 16 and 18 and the conduits 19 and 20 form a closed circuit for refrigerant which I call the secondary circuit. The circulating device 18 is, of course, in direct communication with the refrigerating chamber, and it is placed in heat exchange relation with the primary evaporator. Preferably the circulating chamber 18 is covered with insulation 21 to prevent its absorbing heat except from the secondary circuit. The refrigerating chamber 16 may be used to cool a refrigerator cabinet 22. The compressing device may be started and stopped by a translating device T, which may be an electric motor in the case of a compressor; or an electric heating element, or a fuel burner, in the case of a generator-absorber. The translating device T is supplied with energy through mains 23 when permitted by the controller 24, which may be an electric switch, or a fuel valve, and which may be actuated by a temperature responsive device 26 placed in the cabinet. The compressing device is thus operated in response to refrigerating demand in the cabinet.

It will be understood that the only necessary function of the control device 24 is to permit or prevent operation of the translating device T, in accordance with refrigerating demand. Where the compressing device is of the intermittent or cyclic type, as represented in Fig. 1, a suitable translating device is used which provides the necessary cyclical operation. For example, where 10 is a generator-absorber, the translating device T will insure the alternate heating and cooling of the generator-absorber to generate refrigerant and to absorb refrigerant producing evaporation in the evaporator.

The above-described apparatus operates as follows. When the primary refrigerant is being evaporated, circulating device 18 is very cold. A volatile liquid refrigerant is used in the secondary circuit, for instance enough to fill the chamber 16 half full. This liquid is vaporized by absorbing heat from the cabinet, and the vapor immediately flows through the pipe 19 to the circulating device 18, which then acts as a condenser. The vapor condenses on the cold walls of the chamber 14, giving up its latent heat to the primary refrigerant, and trickles back through the drain 20 into the chamber 16 to be evaporated again. Thus whenever the primary refrigerant is evaporating, refrigerant is withdrawn from the refrigerating chamber in the secondary circuit, transfers heat from the device to be cooled to the primary refrigerant, is condensed to a liquid and returned to the secondary refrigerating chamber.

In case the compressing device is of the intermittent type, such as a generator-absorber, the circulation of the secondary refrigerant takes place only while the primary refrigerant is evaporating in the evaporator 14, that is while the generator-absorber is absorbing. When the generator-absorber is generating, warm liquid refrigerant may be delivered to the primary evaporator, but the secondary refrigerant can not circulate because the warm vapor gravitates to the chamber 18 and remains there without condensing.

In the apparatus above-described, it is essential that the primary evaporator be disposed above the level of the secondary refrigerating chamber in order that the cooled refrigerating medium may circulate back to the secondary refrigerating chamber by gravity. However, it is desirable to construct the apparatus so that the primary refrigerating circuit can be disposed anywhere desired with reference to the secondary circuit, for instance to place the primary apparatus in a basement and the secondary refrigerating chamber at a higher level, on upper floors of the building.

Fig. 2 shows a system similar to Fig. 1 but arranged so that the refrigeration produced in the primary evaporator can be transferred to a distant point, which may be above the level of the primary evaporator. In this case a secondary evaporator 25 corresponding to the evaporator 16 is connected to the chamber 18 by means of a single conduit 31 which enters the chamber 18 at its bottom and is connected to the evaporator 25 at its top. The remaining parts of the apparatus shown in Fig. 2 are the same as those described in connection with Fig. 1.

The system shown in Fig. 2 operates as follows. Assuming that the evaporator 25 is empty and that the secondary refrigerant is collected in liquid form in the chamber 18 as indicated by the level 32. When the intermittent compressing device 10 begins to supply refrigerant a quantity of relatively warm primary liquid refrigerant will flow into the primary evaporator 14. This will immediately vaporize a quantity of the secondary refrigerant and the pressure of the vapor generated will force the remaining liquid refrigerant out of contact with the evaporator 14 and out through the conduit 31 into the secondary evaporator 25. Thereafter primary refrigerant will continue to be supplied to the primary evaporator 14 and although this refrigerant may be warm, no heat will be transferred to the secondary refrigerant because the only secondary refrigerant present in the chamber 18 will be in the form of vapor which will conduct no appreciable amount of heat and which, of course, cannot circulate. After the primary refrigerant supply to the evaporator is stopped and the refrigerant is evaporated therein, the walls of the chamber 14 will become very cold. This will condense the secondary refrigerant in chamber 18, and the condensation will lower the pressure in the secondary circuit and induce evaporation of the liquid in the evaporator 25. The secondary refrigerant evaporated in 25 will flow to the chamber 18 because this is the coldest point in the system, and will be condensed on the walls of the chamber 14 and collect as liquid in the bottom of the chamber 18. The evaporating pressure in the chamber 25 is substantially the same as the condensing pressure in the chamber 18, the difference being merely sufficient to cause flow of the vapor from 25 through the head of liquid 32 into the chamber 18.

Either of the systems above described may be applied to arrangement wherein it is desired to cool a number of individual cabinets. In Fig. 3 a system is shown in which two cabinets 22 are each cooled by an evaporator 25 connected to the circulating chamber 18 by means of a conduit 31. This system operates in all respects in the same manner as that described in connection with Fig. 2, except that refrigeration is supplied at a plurality of separated points. The entire system may be controlled by a single thermostat 26 placed in one of the cabinets or a thermostat may be placed in each cabinet so as to energize the translating device T whenever refrigeration is required by either.

In case the several cabinets 22 are placed at different levels it may be necessary to insure that the secondary refrigerant, when returned as liquid from the chamber 18, will be uniformly distributed among them. In such cases the circulating chamber 18 is divided into as many compartments as there are secondary evaporators so that in effect a plurality of independent secondary circuits are provided, with no opportunity for refrigerant to pass from one secondary circuit to another.

Fig. 4 shows such an arrangement wherein the cabinet 22a is placed at a higher level than the cabinet 22. The circulating chamber 418 is divided into two chambers 418a and 418b by means of a partition 433. In this arrangement all of the refrigerant evaporated within each evaporator will be condensed in its own chamber 418a or 418b and all of it will be returned to the same evaporator.

All of the systems thus far described produce refrigeration intermittently in the primary evaporator and consequently produce refrigeration intermittently in the secondary evaporator.

Fig. 5 shows a system wherein continuous refrigeration is produced in the secondary evaporator by means of a pair of primary refrigerant circuits operated alternately. One primary circuit consists of the compressing device 10, condenser 13 and evaporator 14, with which is associated the circulating chamber 18 all arranged as in Fig. 1. The other primary circuit consists of corresponding compressing device 10a, condenser 13a and evaporator 14a, with which is associated the circulating chamber 18a. The secondary evaporator 525 is connected by means of a conduit 531 with the chamber 18 and by conduit 531a with the chamber 18a. Both of the compressing devices 10 and 10a are of the intermittent type and each is operated by means of translating device 4T, both of which are energized through mains 523 under the control of the control device 24 which either permits or prevents energizing of both the translating devices in accordance with the refrigerating demand of the cabinet 22 as determined by the thermostat 26. Any suitable control device is provided for energizing the translating devices intermittently so that when either translating device is energized the other is de-energized. For example, this may be a clock 35 which actuates a switch 36 to either of two positions, one position energizing the translation device in 10 and de-energizing that in 10a while the other position energizes translating device in 10a and de-energizes that in 10.

The system shown in Fig. 5 operates as follows. Assume that continuous refrigeration is required in the cabinet 22, and that the thermostat 26 has operated the control device 24 to permit energizing of the translating devices and that the clock 35 has turned the switch 36 to the position energizing the one in 10. The compressing device 10 will then supply refrigerant to the evaporator 14. This will continue for a predetermined period of time, at the end of which the clock will turn the switch to the other position, energizing the translating device in 10a and de-energizing that in 10. Therefore the compressing device 10a will supply refrigerant to the evaporator 14a and at the same time the compressing device 10 will evaporate the refrigerant in 14. The evaporation in 14 will produce circulation of the secondary refrigerant between the evaporator 525 and chamber 18 as explained in connection with Fig. 2, the refrigerant collecting as liquid in chamber 18. At the end of another period of time the switch will be returned to the first position after which refrigerant will be evaporated in 14a by the compressing device 10a while the compressing device 10 returns refrigerant to the evaporator 14. During this period the circulation of secondary refrigerant takes place between chamber 18a and the evaporator 525 while the refrigerant previously collected in 18 is returned to the evaporator 525. This arrangement produces substantially continuous evaporation of refrigerant in the secondary evaporator.

Fig. 6 shows an arrangement wherein continuous refrigeration may be provided in the secondary circuit by means of a single primary circuit. In this figure a compressing device 610 is operated by a continuous translating device 6T under the control of the thermostat 26, and when permitted by the thermostat continuously delivers high pressure refrigerant to the condenser 13 wherein the refrigerant is required and from which it flows to a primary evaporator 614, and continuously withdraws gaseous refrigerant from the evaporator 614 through the intake conduit 612. Continuous evaporation of refrigerant is therefore produced in the primary evaporator 614. The circulating chamber 18 is connected to the secondary evaporator 625 by a vapor conduit 619 which enters the chamber 18 near its top, and by a liquid conduit 620 which drains the chamber 18 into the secondary evaporator. The refrigerant vapor in the chamber 18 is continuously condensed on the cold surface of the primary evaporator 614 and the condensed liquid trickles through the pipe 620 into the secondary evaporator, as long as heat is being absorbed by the secondary evaporator to produce evaporation therein. This arrangement therefore produces continuous refrigeration in the secondary evaporator.

Figures 7, 8:
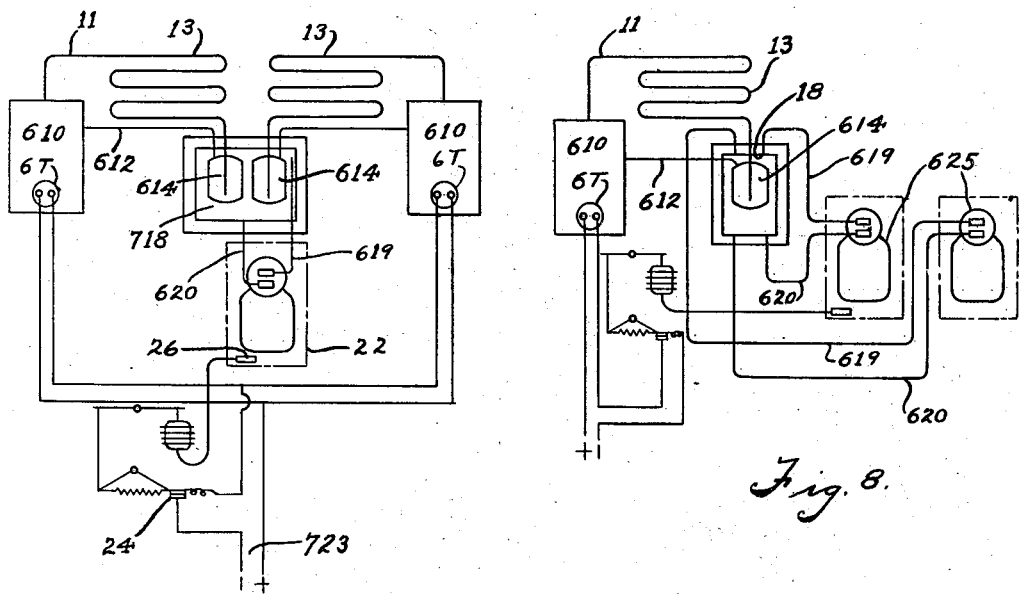

Fig. 7 shows an arrangement similar to Fig. 6 in which two primary refrigerant circuits of the continuous type are employed to produce refrigeration in a single circulating chamber 718 and thus produce continuous refrigeration in the secondary evaporator 625. This arrangement is of advantage when it is desired to refrigerate a secondary circuit of large capacity by means of small capacity primary refrigerating devices.

Fig. 8 shows an arrangement similar to Fig. 6 in which a single primary circuit of the continuous type is used but a plurality of secondary evaporators 625 are refrigerated thereby to produce continuous refrigeration at a plurality of separated points.

Figure 9:
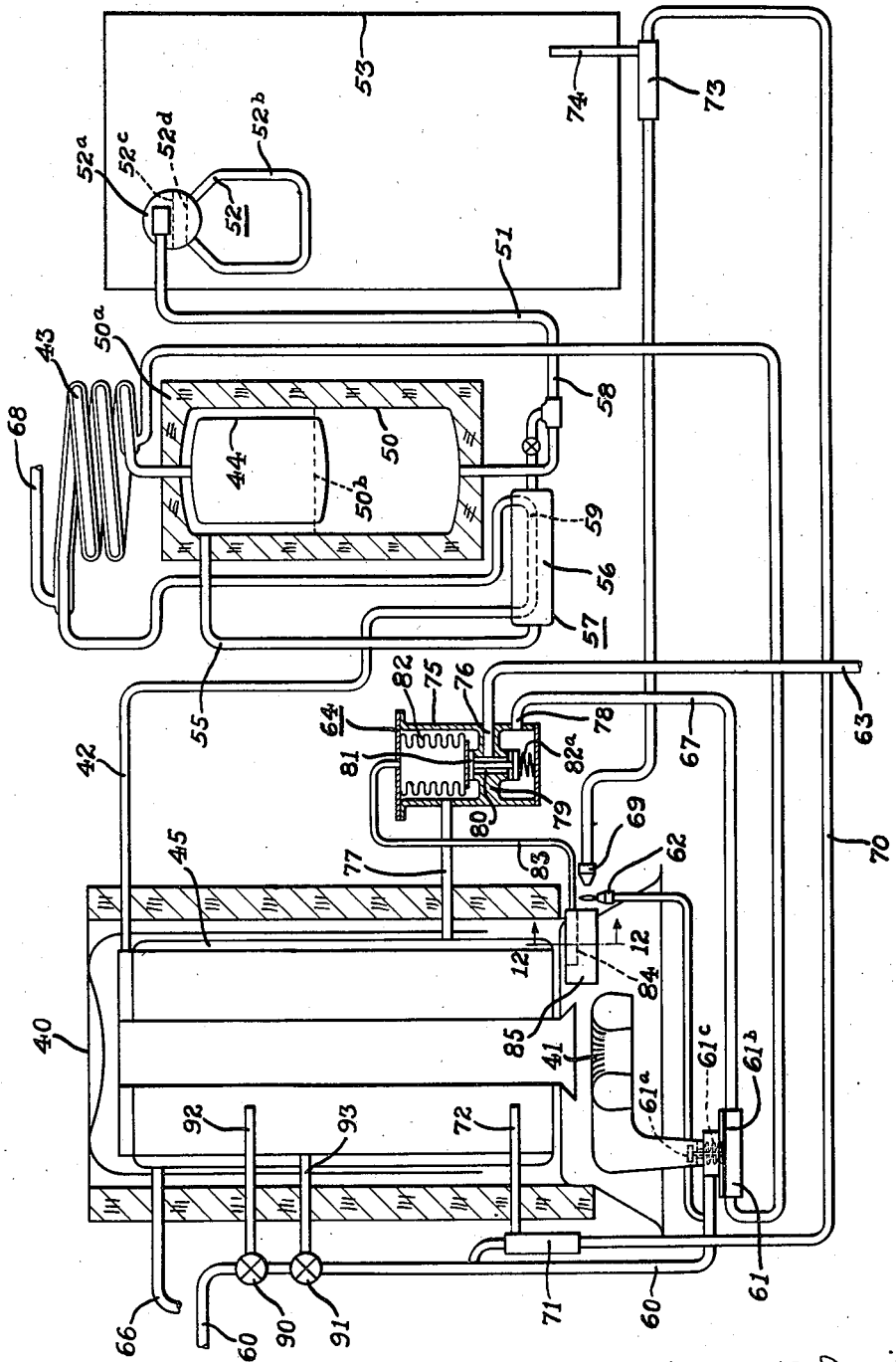
Fig. 9 is a diagrammatic representation of my invention as applied to an absorption system.

Fig. 9 is a diagrammatic representation of an actual apparatus for carrying out the system diagrammatically in Fig. 2.

In this figure, 40 is the compressing device, in this case a generator-absorber which is intermittently heated by a fuel burner 41 to generate gaseous refrigerant, which is delivered under pressure thru a conduit 42 to a condenser 43, where it is liquefied, and then flows to an evaporator 44. The generator-absorber is also intermittently cooled by water flowing thru a cooling jacket 45, to evaporate and absorb the refrigerant in the evaporator 44, the refrigerant returning to the generator-absorber thru the same pipe 42, as is well known in the art. The primary evaporator 44 is placed in heat exchange relation, preferably within a chamber 50, covered with insulation 50a and connected by a conduit 51 to an evaporator 52. The evaporator 44 and chamber 50 form a heat exchanger between the primary and secondary circuits, the secondary circuit consisting of chamber 50, conduit 51 and evaporator 52. The chamber 50 serves as the condenser corresponding to the circulating device 18 in Fig. 1. The evaporator 52 is used to cool any suitable refrigerating cabinet 53 which can be placed wherever desired with reference to the condenser 50 and primary evaporator 44. The secondary refrigerant circuit is charged with a volatile refrigerant, for example, sulphur dioxide.

In general the apparatus operates in the same manner as that shown in Fig. 2. Assume the secondary evaporator to be filled with liquid refrigerant, the condenser 50 to be empty, the primary evaporator 44 to be filled with liquid refrigerant, and the generator-absorber to be absorbing. The refrigerant evaporating in the primary evaporator 44 chills the condenser 50. The secondary refrigerant evaporating in the secondary evaporator 52, due to heat absorbed from the cabinet 43, flows to the coldest part of the secondary circuit, which is the condenser 50. Here it is condensed due to the low temperatures produced by the primary evaporator and collects in liquid form in the chamber 50, eventually reaching the level indicated by the dotted line 50b.

Figure 11:
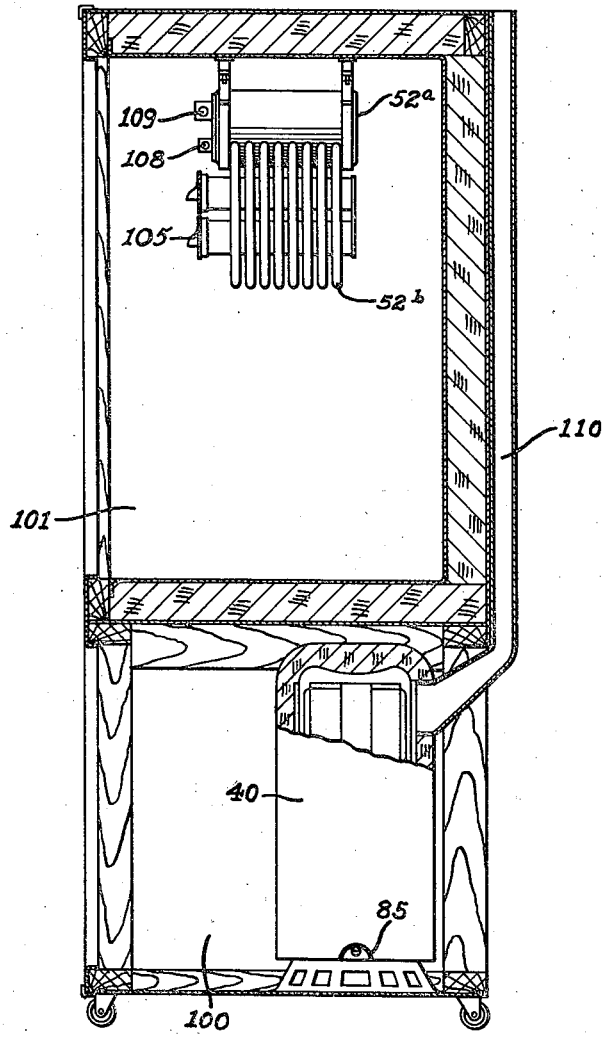
Fig. 11 is a section on the line 11—11 of Fig. 10.
Figure 12:
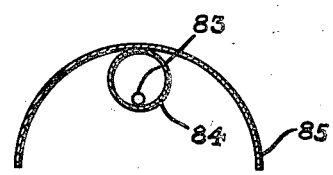
Fig. 12 is a section of a detail on the line 12—12 of Fig. 9.

Preferably the evaporator 52, as disclosed more fully in Fig. 11 consists of a header 52a forming a reservoir for liquid refrigerant and a number of depending loops of tubing 52b which constitute evaporating chambers and present a large heat exchange surface. The amounts of refrigerant in the two circuits are preferably so proportioned that when all of the secondary refrigerant is in the secondary evaporator, the latter is filled to the level 52c and that when all of the primary refrigerant has been evaporated (thus transferring refrigerant from the secondary evaporator 52 to the chamber 50 as indicated by the level 50b) the level of refrigerant in the secondary evaporator has been reduced to the level 52d. By this arrangement the secondary evaporator is kept substantially flooded with liquid refrigerant at all times, thus providing a hold-over and preventing the transfer of heat into the cabinet as will be explained in detail below. When all of the primary refrigerant has been absorbed in the generator-absorber the control apparatus described below initiates the generating phase of the primary circuit. Hot gaseous refrigerant then passes thru the pipe 42 to the condenser 43, as is well known in the art. Since this hot gas flows to the coldest part of the system and since the evaporator 44 is colder than the condenser, some of the hot vapor will flow to the evaporator and condense there, until the pressure increases to a value sufficient to liquefy all of the vapor in the condenser. In condensing in the evaporator, the vapor gives up its latent heat, which is absorbed by the secondary refrigerant, a small part of which is evaporated. The vapor pressure then forces the remaining liquid up into the secondary evaporator. After generation has gotten well under way all of the primary gaseous refrigerant condenses in the condenser.

However, in some cases I find that not enough primary refrigerant may be condensed in the evaporator 44 to force all of the secondary liquid quickly back into the secondary evaporator. Therefore I provide the following means for quickly forcing substantially all of the secondary refrigerant, in liquid form, into the secondary evaporator, which operation I call dumping.

Connected between the secondary evaporator and the condenser is a parallel conduit 55 which includes one chamber 56 of a heat exchanger 57, disposed below the level of the condenser. Preferably the conduit 55 is connected to the upper side of the horizontal portion 58 of the conduit 51 for a purpose to be described. The other chamber 59 of the heat exchanger 57 is included in the conduit 42 between the generator-absorber and the condenser 43 or other source of heat. When liquid refrigerant collects in the secondary condenser the chamber 56 of the heat exchanger is filled. In passing thru the heat exchanger, the uncondensed primary refrigerant gives up some of its heat to the secondary refrigerant therein and evaporates a small amount of the latter. The vapor rises thru the parallel circuit 55 and creates a pressure in the condenser which forces the liquid refrigerant up into the secondary evaporator thru the pipe 51. In other words, the primary circuit automatically furnishes the energy required to lift the refrigerant from the condenser to the secondary evaporator. This energy, in the form of heat, is transferred from the primary refrigerant to the secondary refrigerant in the heat exchanger 57, and is there transformed into potential energy in the form of vapor pressure, and this potential energy is expended by expanding the vapor and lifting the refrigerant up to the secondary evaporator. Eventually the liquid remaining unevaporated by the heat of the primary circuit is forced up in the evaporator and the chamber 56 of the heat exchanger 57 and the condenser chamber 50 are filled with vapor. This vapor absorbs a very small amount of heat from the primary refrigerant passing thru the chamber 59, serving in effect as an insulator for that chamber. Consequently after the secondary refrigerant has been lifted to the evaporator, the secondary circuit absorbs practically no heat from the primary circuit. The generator continues to give off gaseous refrigerant which is condensed and delivered to the evaporator 44 until the controls stop generating and initiate the absorbing phase. The cycle above described repeats itself indefinitely.

During the absorbing phase, when the secondary refrigerant is evaporating, it is possible that some liquid refrigerant may trickle back into the pipe 51 from the condenser 50. In order to prevent such refrigerant from getting into the heat exchanger and thus absorbing heat from the primary circuit, the conduit 55 is placed above the level of the conduit 58, and is connected to the latter on its upper side.

*Controls*

The apparatus above described may be controlled in any suitable manner, for example the one described below. The burner 41 is supplied with fuel, such as gas, thru a main 60 under the control of a water-operated valve 61. This includes a shut-off valve 61a which is attached to a pressure responsive diaphragm 61b, and is lifted to open the gas line by pressure of water under the diaphragm. When the water pressure fails, the spring 61c forces the diaphragm down and the valve closes. A primary pilot 62 is supplied directly from the main 60 and burns continuously. Water is supplied to the system from a main 63, passes thru a water switch 64, either to the cooling jacket 45 of the generator-absorber from which it overflows thru a waste pipe 66, or else thru the pipe 67 to the gas valve 61 and thence thru the condenser 43 and to a waste pipe 68. A secondary pilot burner 69, placed at a distance from the main burner is supplied with gas thru the pilot circuit 70 which includes a shut-off valve 71 actuated by a thermostat 72 placed in the generator-absorber, and a shut-off valve 73 actuated by a thermostat 74 placed in the refrigerator cabinet. The thermostats are so arranged that the valve 73 is opened when refrigeration is required in the cabinet and the valve 71 is closed when the generator-absorber is above a predetermined high temperature.

The water switch 64 includes a casing 75 provided with an inlet 76 for the main 63, an outlet 77 leading to the cooling jacket of the generator absorber and an outlet 78 leading to the gas valve. The casing is divided into two chambers by a partition 79 having a passage 80 which communicates with each of said outlets. A double valve 81 is adapted to close either end of this passage and at the same time open the other end so as to divert water thru either of the outlets. This valve is mounted on a sylphon or bellows 82, the open end of which is attached to the upper end of the casing 75. This bellows may be biased to hold the valve in its upper position so as to direct water thru the outlet 77 by a spring 82a. A pipe 83 is connected with the interior of the bellows at one end and is connected to a small boiler 84 at its other end, the bellows, pipe and boiler forming a closed system. The system contains a quantity of liquid such as water. The boiler 84 is placed between the secondary pilot and the burner in the path of the pilot flame. If desired, a shield or fin 85 may be associated with the boiler to cover the pilot flame and thus assure rapid transfer of heat from the pilot flame to the boiler.

The control system operates as follows: Assume the generator-absorber to be cold and the refrigerator cabinet to be warm. Valves 71 and 73 are both open and gas flows to the secondary pilot 69, where it is ignited by the primary pilot 62. The pilot flame 69 is adjusted to reach the burner 41 and to heat the boiler 84. When the water in the boiler has been converted into steam the pressure in the sylphon 82 expands the sylphon to shift the valve to direct water from the main 63 thru the gas valve 61 and to the condenser 43. The valve 61 opens the supply of gas to the main burner when water flows thru it. Therefore, as soon as the water switch turns the water thru the gas valve the latter opens and the gas is ignited by the secondary pilot 69. This initiates the generating phase of the absorption apparatus. The amount of water in the boiler and bellows is so adjusted with relation to the capacity of the boiler and the capacity of the bellows that when the bellows has expanded there is no liquid in the boiler. Consequently continued heating of the boiler during the absorption of the generator is not injurious.

When the generator has been heated sufficiently to give off the desired quantity of its refrigerant, as determined by the setting of thermostat 72, the valve 71 is closed, extinguishing the pilot 69 and permitting the boiler 84 to cool. The steam then condenses to water and the bellows contracts to shift the valve and direct the cooling water thru the cooling jacket, thus initiating the absorbing phase. This produces refrigeration, cooling the cabinet 53 and causes the thermostat 74 to close the valve 73. When the generator-absorber has become cold the valve 71 is opened but the next cycle does not begin until refrigeration is required in the cabinet, at which time the valve 73 will be opened to permit gas to flow to the pilot 69.

Suitable safety controls are provided in the form of shut-off valves 90 and 91 in the gas main. These valves are normally open but are closed upon the occurrence of abnormal or dangerous conditions and remain closed until reset by hand. The valve 90 is closed by a thermostat 92 placed within the generator-absorber upon the occurrence of a predetermined high temperature, and the valve 91 is closed by excessive pressure communicated to it by a pipe 93 communicating with the interior of the generator-absorber.

Figure 10:
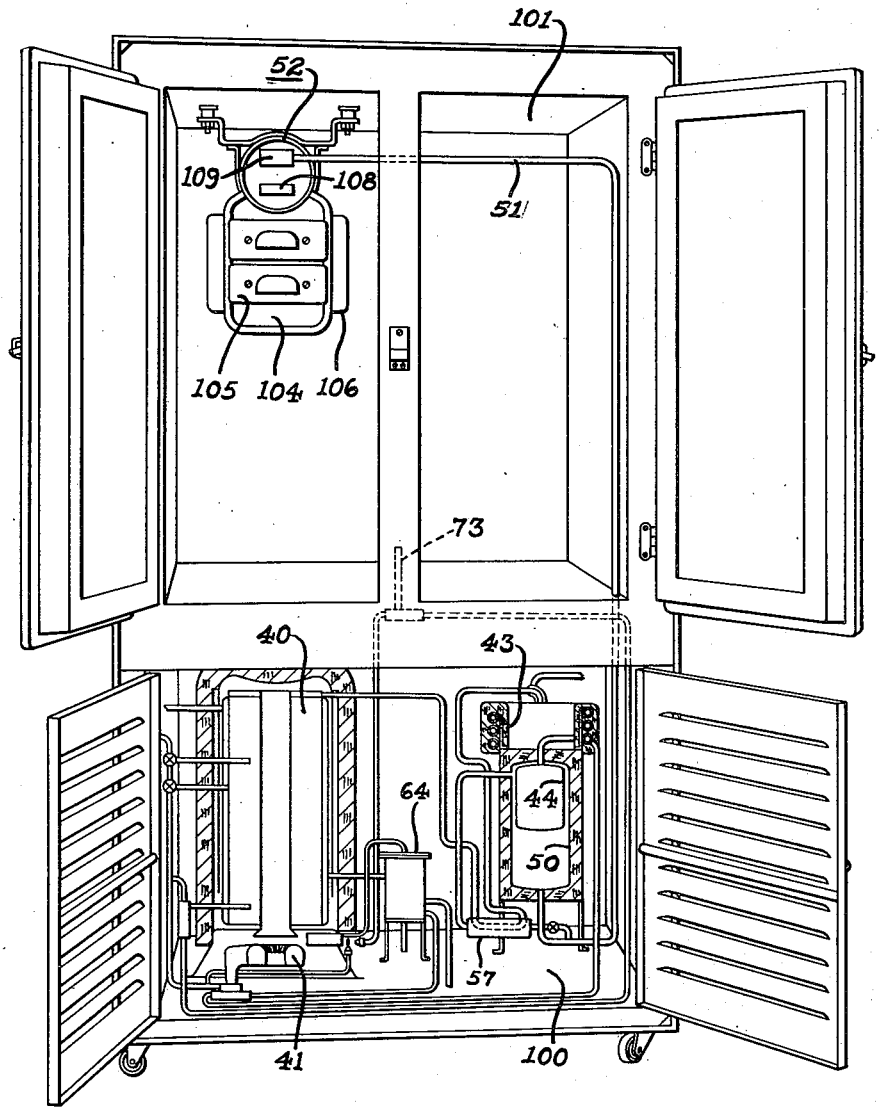
Fig. 10 shows an apparatus constructed in accordance with my invention arranged in a refrigerator cabinet, certain portions of the apparatus being shown in section.

Figs. 10 and 11 show the structural arrangement of the system illustrated in Fig. 3 in a conventional refrigerating cabinet. This cabinet includes a machine compartment 100 in which the apparatus illustrated in Fig. 9 is placed, and a refrigerating compartment 101, above the machine compartment, and in which the secondary evaporator is placed. The evaporator may be of the type shown in the patent to Osborn, No. 1,556,708 October 13, 1925, and preferably includes a header 52a forming a reservoir for liquid refrigerant and a plurality of loops of tubing 52b which form refrigerant circulating ducts and also form an enclosure 104 for ice-making receptacles 105. If desired, the ducts 52b may be provided with fins 106 to increase the heat transfer surface. Such evaporators are standard equipment in compression refrigerating systems and usually include a shut-off valve 108 for connection to a liquid supply conduit and a shut-off valve 109 for connection to a vapor return conduit. In the present arrangement, I dispense with one of such conduits, and both supply liquid to the header 52a and withdraw vapor from the header through the single conduit 51, connected above the maximum level of liquid in the header which is determined by the amount of secondary refrigerant in the system. The generator-absorber is provided with a flue 110 for carrying off products of combustion, which passes through the back of the machine compartment and may be disposed anywhere desired, for example, by being attached to the back of the cabinet as shown in Fig. 11.

Instead of circulating primary refrigerant through the heat exchanger 57 to generate pressure in the condenser 50 and thus lift the secondary refrigerant into the evaporator 52, I may employ an independent vapor circuit associated with the primary circuit. For example another boiler similar to 84 could be connected with the chamber 59 of the heat exchanger 57 by means of a pair of pipes similar to 83, the boiler, pipes and chamber forming a closed circulating system containing a limited quantity of water. In this arrangement when the burner 41 is turned on, the water in the boiler would be converted to steam and this steam would be condensed in the heat exchanger 57 vaporizing a sufficient quantity of refrigerant to produce the desired vapor pressure in the condenser 50. As is the case where the primary refrigerant heats the exchanger no heat will be transmitted to the secondary after the secondary refrigerant in the exchanger has been vaporized.

It will be understood that Figs. 1 to 8 are merely diagrammatic illustrations of various ways in which my invention can be applied to refrigerating systems, and that Figs. 9 to 12 illustrate one method of constructing actual apparatus for carrying out the invention in such systems. It will be evident that apparatus constructed as indicated in Figs. 9 to 12 may be connected and arranged according to any of the systems indicated in Figs. 1 to 8.

While the form of embodiment of the invention as herein disclosed constitutes a preferred form, it is to be understood that other forms might be adopted, all coming within the scope of the claims which follow.

What is claimed is as follows.

1. Refrigerating apparatus comprising in combination a primary refrigerating circuit including an evaporator and a secondary refrigerating circuit including an evaporator and a condenser connected thereto and arranged in heat exchange relation with the primary evaporator, the secondary evaporator being at a higher level than the secondary condenser, and the circuits being arranged to lift liquid refrigerant from the secondary condenser to the secondary evaporator by energy developed in the primary circuit.

2. Refrigerating apparatus comprising in combination a primary refrigerating circuit including an evaporator; and a secondary refrigerating circuit including an evaporator and a condenser connected thereto and arranged in heat exchange relation with the primary evaporator, the secondary evaporator being at a higher level than the secondary condenser, and means associated with the primary circuit for evaporating a portion of the liquid refrigerant in the secondary circuit to lift the remaining liquid into the secondary evaporator.

3. In refrigerating apparatus means for transferring refrigeration in latent form from a low level to a high level including means for producing refrigeration, means associated with the producing means for condensing a volatile refrigerant, means for evaporating a portion of the condensed refrigerant to produce pressure to force the remaining liquid refrigerant to a higher level, means for evaporating the condensed refrigerant at the higher level and means for returning the evaporated refrigerant to be condensed, said evaporation and condensation being carried out at substantially the same refrigerant pressure.

4. Refrigerating apparatus comprising in combination a primary refrigerating circuit including an evaporator and a secondary refrigerating circuit including an evaporator and a condenser connected thereto and arranged in heat exchange relation with the primary evaporator, the secondary evaporator being at a higher level than the secondary condenser, and a heater below the level of the secondary condenser and associated with the primary circuit for evaporating liquid refrigerant in the secondary circuit.

5. In refrigerating apparatus a refrigerant circuit including an evaporator, and a condenser connected to the evaporator and disposed below its level, and means for generating refrigerant vapor under pressure in the condenser to force condensed refrigerant into the evaporator.

6. Refrigerating apparatus comprising in combination a condenser, an evaporator above the level of the condenser and connected to the bottom of the condenser by means of a conduit having a portion disposed below the level of the condenser, a conduit connecting the lower portion of said first-mentioned conduit with the upper portion of the condenser, and means for vaporizing liquid refrigerant in said last-mentioned conduit.

7. Refrigerating apparatus comprising in combination a primary refrigerant circuit including an evaporator, a generator-absorber, and means for periodically heating the generator-absorber; a secondary refrigerant circuit including an evaporator and a condenser, the condenser being below the level of the evaporator and disposed in heat exchange relation with the primary evaporator, and means associated with said heating means for vaporizing liquid refrigerant in the condenser to force the remaining liquid into the secondary evaporator.

8. Refrigerating apparatus comprising in combination a primary refrigerant circuit including an evaporator, a generator-absorber, and means for periodically heating the generator-absorber; a secondary refrigerant circuit including an evaporator and a condenser, the condenser being below the level of the evaporator and disposed in heat exchange relation with the primary evaporator, and means associated with said heating means for vaporizing liquid refrigerant in the condenser to force the remaining liquid into the secondary evaporator, said means being inoperative to conduct heat into the secondary circuit after a predetermined amount of heat has been conducted.

9. Refrigerating apparatus comprising in combination a primary refrigerant circuit including an evaporator, a generator-absorber, and means for periodically heating the generator-absorber; a secondary refrigerant circuit including an evaporator and a condenser, the condenser being below the level of the evaporator and disposed in heat exchange relation with the primary evaporator, and means for vaporizing liquid refrigerant in the condenser to force the remaining liquid into the secondary evaporator, means associated with said heating means for generating vapor in an independent circuit, a heat exchanger associated with the secondary circuit and means for conducting said vapor into the heat exchanger.

10. The method of transferring refrigeration in latent form which consists in producing refrigeration, condensing a volatile refrigerant at the point where refrigeration is produced, evaporating a portion of the condensed refrigerant to produce pressure to force the remaining condensed refrigerant to a higher level, evaporating the refrigerant at the higher level, and returning the evaporated refrigerant to the point of condensation, said evaporation and condensation being carried out at substantially the same refrigerant pressure.

11. The method of transferring refrigeration in latent form which consists in producing refrigeration, condensing and collecting a volatile refrigerant at the point where refrigeration is produced, evaporating a portion of the condensed refrigerant to produce pressure to force the remaining condensed refrigerant to a distant point, evaporating the refrigerant at the distant point and returning the evaporated refrigerant to the point of condensation, said evaporation and condensation being carried out at substantially the same refrigerant pressure.

12. A refrigerating system including a closed volatile liquid circuit comprising an evaporator and a condenser positioned below said evaporator, means for cooling the condenser to evaporate the volatile liquid in the evaporator and condense the vapors thereof in said condenser, and means for heating said condenser to force volatile liquid back into said evaporator.

13. A refrigerating system including a closed volatile liquid circuit comprising an evaporator and a condenser positioned below said evaporator, a second refrigerating circuit including a second evaporator, and means for transferring heat from said condenser to said second evaporator and from said second evaporator to said condenser.

14. The method of refrigeration which consists in condensing vapors of a volatile liquid, evaporating a portion of the condensed liquid to produce a pressure sufficient to remove the remaining liquid to a higher level, evaporating the removed liquid, and returning the evaporated liquid to the point of condensation, the evaporation and condensation taking place at substantially the same pressure.

15. Refrigerating apparatus including a closed secondary circuit including a plurality of condensers and an evaporator, connections between said condensers and said evaporator, means for alternately cooling said condensers whereby liquid refrigerant continuously evaporates in said evaporator and condenses alternately in said condensers, said cooling means including a refrigerator circuit including a cooling unit in heat exchange relation with each condenser, and means responsive to the conditions of said evaporator for controlling the operation of said refrigerant circuit.

16. Refrigerating apparatus including in combination a refrigerating circuit including an evaporator, and a second refrigerant circuit comprising a second evaporator and a condenser, said second evaporator being located above said condenser and said condenser being disposed in heat exchange relation with said first named evaporator, and means responsive to the temperature of said second evaporator for controlling the operation of said first named circuit.

17. Refrigerating apparatus including in combination a refrigerant circuit including an evaporator, and a second refrigerant circuit comprising a second evaporator and a condenser, said second evaporator being located above said condenser and said condenser being disposed in heat exchange relation with said first named evaporator and means responsive to the conditions of said second named evaporator for controlling the operation of said first named circuit.

18. In refrigeration apparatus of the intermittent absorption type, the combination with the evaporator, of a gas tight shell surrounding and spaced from the same, and a vessel below the plane of the evaporator in heat exchanging relation to the refrigeration space of the apparatus and containing a volatile liquid, the interiors of said shell and said vessel being in communication so that the vapors of said liquid may rise into the shell and be condensed therein by contact with the evaporator during the cooling period.

19. In refrigeration apparatus of the intermittent absorption type, in combination with the evaporator, a shell spaced from the wall of the evaporator and forming therewith a chamber, and a vessel in heat exchanging relation to the refrigeration space of the apparatus and whose interior is in communication with the aforesaid chamber, the two forming a sealed enclosure, said vessel containing a volatile liquid and so positioned with respect to said chamber that vapors of said liquid when condensed upon the wall of the evaporator will return by gravity to the body of liquid in the vessel.

20. Refrigerating apparatus comprising in combination a primary refrigerant circuit including an evaporator, a second refrigerant circuit comprising a second evaporator disposed above the level of the first evaporator and a condenser connected to the second evaporator and disposed in heat exchange relation with the first evaporator, said condenser being maintained at a lower temperature than said second evaporator by said first evaporator.

21. Refrigerating apparatus comprising in combination a refrigerant circuit including an evaporator and a second refrigerant circuit comprising a second evaporator disposed above the level of the first evaporator, and a condenser connected to the second evaporator and disposed in heat exchange relation with said first evaporator, said condenser and said second evaporator operating at substantially the same pressures.

22. Refrigerating apparatus comprising in combination a refrigerant circuit including an evaporator and a second refrigerant circuit comprising a second evaporator disposed above the level of the first evaporator, and a condenser connected to the second evaporator and disposed in heat exchange relation with said first evaporator, said condenser being in open communication with said second evaporator whereby condensation and evaporation takes place at substantially the same pressures.

23. Refrigerating apparatus comprising in combination a refrigerant circuit including an evaporator, a second refrigerant circuit including as elements thereof a condenser, a second evaporator and connections therebetween, said condenser being located in heat transfer relation with the first mentioned evaporator, and being in open communication with said second evaporator whereby condensation and evaporation take place at substantially the same pressures, the elements of the secondary circuit being so arranged that the force of gravity must be overcome to return liquid refrigerant collecting in said condenser to said secondary evaporator.

24. Refrigerating apparatus for an object to be cooled comprising a primary circuit including an evaporator, a closed secondary refrigerant circuit containing a volatile liquid and including a condenser and a second evaporator, said condenser being located in heat exchange relation with the first named evaporator and out of heat exchange relation with the object to be cooled, and means responsive to conditions produced by said second named evaporator for controlling the operation of said first named circuit.

25. Refrigerating apparatus for an object to be cooled comprising a primary circuit including an evaporator, a closed secondary refrigerant circuit containing a volatile liquid and including a condenser and a second evaporator, said condenser being located in heat exchange relation with the first named evaporator and out of heat exchange relation with the object to be cooled, and means responsive to temperatures produced by said second named evaporator for controlling the operation of said first named circuit.

HARRY F. SMITH.